Patented Nov. 29, 1927.

1,651,104

UNITED STATES PATENT OFFICE.

BENJAMIN C. REED, OF INDIANAPOLIS, INDIANA.

JOINT COMPOSITION.

No Drawing.    Application filed February 28, 1925. Serial No. 12,223.

This invention relates to a composition especially designed for use as a "dope" or compound for application to threaded and other joints, leaks, etc., especially useful in connection with such joints in steam lines or other places where high temperatures exist and there is need for occasional separation of joints, the composition being of such character as to be resistant to temperatures and pressures through long periods of time.

The composition constituting this invention is composed of the following materials combined in substantially the proportions set forth, to wit:

A cereal flour or meal, conveniently wheat flour, corn flour or corn meal, approximately 50 parts; wood fibre approximately 40 parts; whiting approximately 5 parts; asbestos fibre approximately 4 parts; graphite, flake, comminuted or colloidal, approximately 1 part. Having produced a mechanical mixture of the ingredients specified above, there is added thereto an approximately equal volume of a mixture of good lubricating oil and lubricating grease, a sufficient quantity of grease being used to prevent settling of the other ingredients in the oil i. e., enough to retain the oil, or major portion thereof, in the body of the ultimate mixture.

Entirely satisfactory results, in insuring a tight joint by the use of the above described mixture, are obtained when the grease is not included, but to insure such satisfactory results it is necessary to thoroughly shake and stir the mixture to incorporate the oil with the sedimentary ingredients before application to the joint, and this necessity is avoided if the grease has been incorporated, said grease apparently serving as a sedimentation preventative.

The graphite may also be omitted if desired but in that case, separation of a treated joint is not quite so easy.

Joints produced with the composition described above remain tight under difficult conditions, high pressures and high temperatures and do not "freeze" even if undisturbed for long periods, being at all times readily separable.

The composition of dry ingredients mentioned above may, if desired, be supplied without the oil, or oil and grease, said oil or oil and grease being readily added by the user if desired.

I claim—

1. A joint composition comprising a starchy cereal approximately fifty parts; wood fibre approximately forty parts; whiting approximately five parts; and asbestos fibre approximately four parts.

2. A joint composition comprising a starchy cereal approximately fifty parts; wood fibre approximately forty parts; whiting approximately five parts; asbestos fibre approximately four parts and graphite one part.

3. A joint composition comprising a starchy cereal approximately fifty parts; wood fibre approximately forty parts; whiting approximately five parts; asbestos fibre approximately four parts and a lubricating oil.

4. A joint composition comprising a starchy cereal approximately fifty parts; wood fibre approximately forty parts; whiting approximately five parts; asbestos fibre approximately four parts; graphite approximately one part and a lubricating oil.

5. A joint composition comprising a starchy cereal approximately fifty parts; wood fibre approximately forty parts; whiting approximately five parts; asbestos fibre approximately four parts; a lubricating oil and a lubricating grease sufficient to prevent sedimentation.

6. A joint composition comprising a starchy cereal approximately fifty parts; wood fibre approximately forty parts; whiting approximately five parts; asbestos fibre approximately four parts; graphite approximately one part; a lubricating oil and a lubricating grease sufficient to prevent sedimentation.

In witness whereof, I have hereunto set my hand at Indianapolis, Indiana.

BENJAMIN C. REED.